US007845233B2

(12) United States Patent
Seagrave

(10) Patent No.: US 7,845,233 B2
(45) Date of Patent: Dec. 7, 2010

(54) SOUND SENSOR ARRAY WITH OPTICAL OUTPUTS

(76) Inventor: Charles G. Seagrave, 258 Orange Blossom La., San Rafael, CA (US) 94903-2506

( * ) Notice: Subject to any disclaimer, the term of this patent is extended or adjusted under 35 U.S.C. 154(b) by 378 days.

(21) Appl. No.: 12/024,049

(22) Filed: Jan. 31, 2008

(65) Prior Publication Data

US 2008/0184803 A1 Aug. 7, 2008

Related U.S. Application Data

(60) Provisional application No. 60/899,123, filed on Feb. 2, 2007.

(51) Int. Cl.
*G01H 17/00* (2006.01)
*H04R 5/02* (2006.01)

(52) U.S. Cl. .......................... 73/649; 381/303; 381/305

(58) Field of Classification Search .................. 73/649; 381/300, 302–305, 58–59
See application file for complete search history.

(56) References Cited

U.S. PATENT DOCUMENTS

| | | | | |
|---|---|---|---|---|
| 4,458,362 | A * | 7/1984 | Berkovitz et al. | 381/103 |
| 5,710,752 | A | 1/1998 | Seagrave et al. | 369/97 |
| 6,760,451 | B1 * | 7/2004 | Craven et al. | 381/98 |
| 2003/0031333 | A1 * | 2/2003 | Cohen et al. | 381/303 |
| 2003/0235318 | A1 * | 12/2003 | Bharitkar et al. | 381/304 |
| 2004/0252930 | A1 | 12/2004 | Gorelik et al. | |
| 2005/0031143 | A1 * | 2/2005 | Devantier et al. | 381/300 |
| 2005/0094821 | A1 * | 5/2005 | Bharitkar et al. | 381/17 |

FOREIGN PATENT DOCUMENTS

| | | | | |
|---|---|---|---|---|
| JP | 2002214890 | A | * | 7/2002 |
| JP | 2004029048 | A | * | 1/2004 |
| JP | 2010149885 | A | * | 7/2010 |

* cited by examiner

*Primary Examiner*—Hezron Williams
*Assistant Examiner*—Rose M Miller
(74) *Attorney, Agent, or Firm*—West & Associates, A PC; Theodore A. Marsh; Stuart J. West

(57) ABSTRACT

Two or more sound sensors are placed in a space of interest. Each sensor has a light-emitting output. Each sensor can be positioned at a specific location, such as at an ear location for a seated listener. An excitation source can provide a specified acoustical energy stimulus to the space. A user can obtain a visual impression of acoustical response of the space corresponding to the sound sensors' positions. An image acquisition system can acquire an image of the sound sensors responding to a stimulus. Acquired images can be analyzed to determine response characteristics. A presentation system can provide a display of response characteristics.

16 Claims, 7 Drawing Sheets

SOUND SENSOR ARRAY WITH OPTICAL OUTPUTS

PRIORITY

This application is related to and claims priority under 35 U.S.C. 119(e) to U.S. Provisional Patent Application No.: 60/899,123 filed on Feb. 2, 2007 entitled "SOUND SENSOR ARRAY WITH OPTICAL OUTPUTS" by Charles G. Seagrave the complete content of which is hereby incorporated by reference.

BACKGROUND

1. Field of the Invention

This invention generally relates to acoustical instrumentation, specifically to the visual display of the acoustic properties of a space such as a room.

2. Description of the Related Art

A desire to provide optimal listening experiences in entertainment and education venues can motivate development of systems and methods for evaluating and/or adjusting acoustical behavior at one or more specified positions within a space, responsive to one or more specified excitation sources.

A commercial movie theater is just one example of a space in which acoustic response can be of particular interest. During the showing of a movie, the audience can comprise many persons, with each person disposed at his or her own specific position within the space. There are typically one or more loudspeakers in a commercial movie theater. The acoustical responses at specific positions in response to one or more of the loudspeakers can be characterized. That is, a response characteristic can be associated with a specific position, such as the position a member of the audience might have when seated in a particular chair. Such response characteristics can be usefully employed for analysis and adjustment of acoustical and electro-acoustical attributes of the space. In a typical movie theater environment, there can be a need to provide response characteristics at one or more positions that meet specified performance criteria. Adjustments to the response characteristics can be accomplished by one or more of many available techniques. These techniques can include, but are not limited to: making adjustments to the architectural acoustic properties of the space; signal processing applied to sound signals that are subsequently reproduced by one or more loudspeakers in a sound reinforcement system; adjusting the number, locations, directivity, and/or other properties of loudspeakers; and/or simply making arrangements to avoid having audience members disposed in specific positions that have relatively unfavorable response characteristics. In some cases, simply repositioning or removing a single chair can be a favorable adjustment.

Concert halls, home theaters, classrooms, auditoriums, and houses of worship are further examples of spaces where acoustic response can be of interest. It can be appreciated that the excitation source and/or sources need not be loudspeakers. For example, in a concert hall there can be a need to characterize the acoustical response at a particular audience position in response to a musical instrument such as a violin, as the violin is played at a specified position on a stage.

One established method of evaluating and adjusting the electro-acoustical behavior of exemplary spaces including auditoriums and listening or home theatre rooms is typically both complex and time-consuming. It involves manually setting up a single microphone or microphones arranged in an array within the listening room or auditorium. One set of data can be gathered from the initial set-up, but the microphones must be physically picked up from their initial positions, and put down in new positions around the room. This repositioning of the microphones is needed in order for the testing and adjusting to provide results having sufficiently useful coverage.

An excitation source can generate multiple frequency sweeps and/or impulses. Corresponding measurements from the microphones must be gathered and correlated with the microphone positions. Many iterations of testing steps and adjustments can be required in order to generate confident results. These iterations can include repositioning, adding, and/or removing: loudspeakers and/or furniture and/or wall treatments and/or floor treatments and/or ceiling treatments and/or bass traps and/or diffusers and/or sound absorption materials and/or other acoustic treatments. For each adjustment made, there can be a need to acquire another set of characterizing data. This data can be compared with previously gathered data in order to determine an extent to which acoustical performance goals are being met. This repeated data acquisition and analysis interspersed with small or large adjustments can require significant amounts of labor and/or materials, and can result in unfavorable time frames and/or expenses.

In some circumstances, an array of wired microphones can be employed. This can help to accelerate a testing and/or characterization process, as it allows for simultaneous measurements at multiple positions. However, an array of wired microphones and a measurement system capable of adequately receiving signals from those microphones can be costly and/or unwieldy. It is likely that for a given space, the array of microphones will need to be positioned multiple times, and used to acquire measurements multiple times, as adjustments are made and/or in order to adequately characterize acoustical response at positions of interest in the space.

Other extant methods of evaluating and/or adjusting acoustic and/or electro-acoustic behavior of specific spaces employ computational analysis; these methods can include computer-aided modal analysis and/or modeling. Even a relatively simply-defined space tends to have enormously complicated acoustical properties that can be important contributors to a characterized response. Due to this attendant complexity, computational analysis can be a fairly crude method of predicting acoustical behavior in exemplary spaces, and is generally most useful only when the geometry of the space considered is very simple. Assumptions made in order to simplify the analysis can effectively invalidate the results. Analysis is further complicated when multiple excitation sources (loudspeakers) and/or listening positions are taken into account.

Thus there is a need for a system and method to effectively characterize acoustic responses for positions within a space.

DETAILED DESCRIPTION

Figure 1:
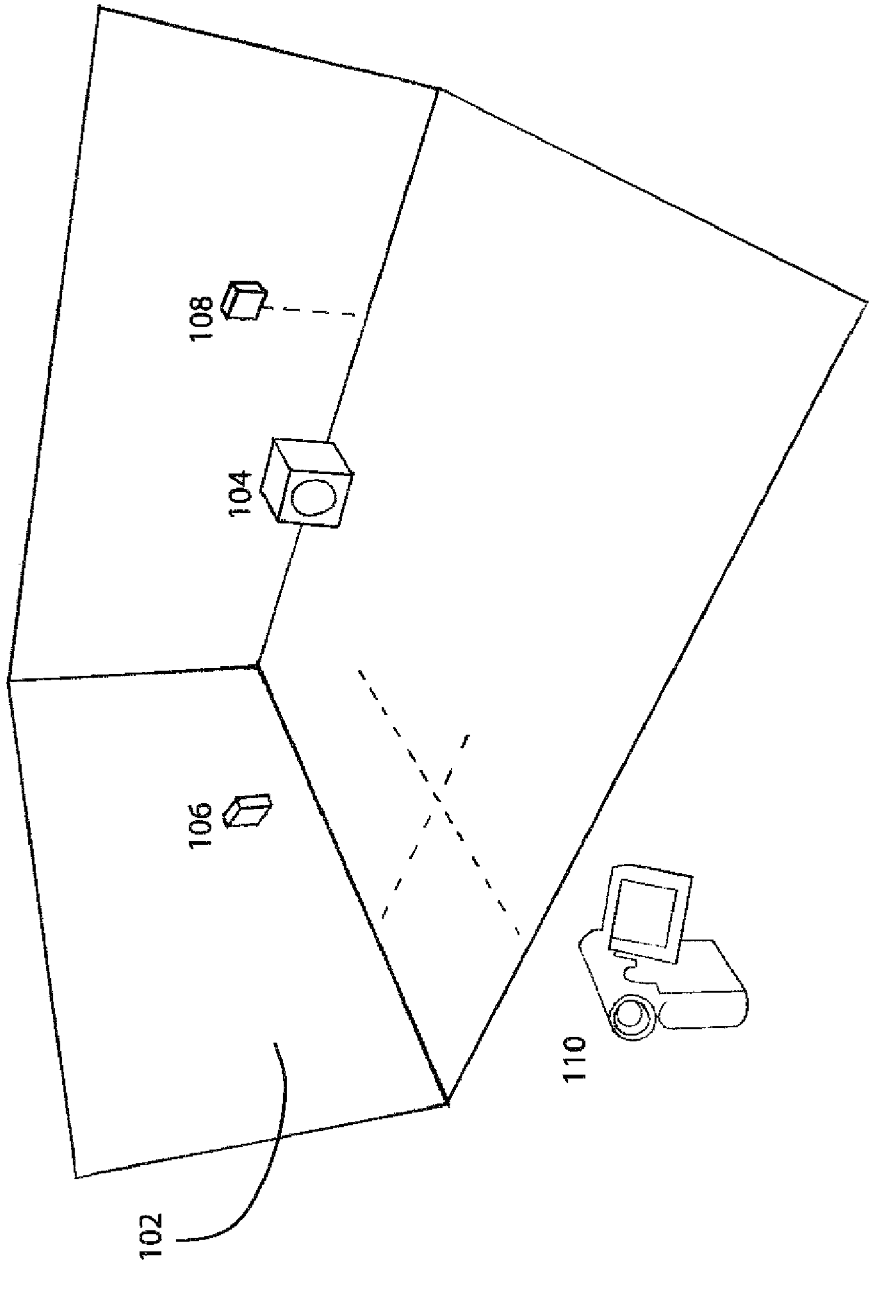
FIG. 1 illustrates a space and system elements.

FIG. 1 depicts an embodiment comprising a space 102, an excitation source 104, sensor modules 106 108, and an image acquisition system 110. Each sensor module 106 108 can be responsive to acoustical energy provided by the excitation source 104. Each sensor module 106 108 can provide a light output that is responsive to acoustical energy sensed by the sensor module, at essentially the position of the sensor module. The image acquisition system 110 can acquire an image of the sensor modules' light output.

Figure 2:
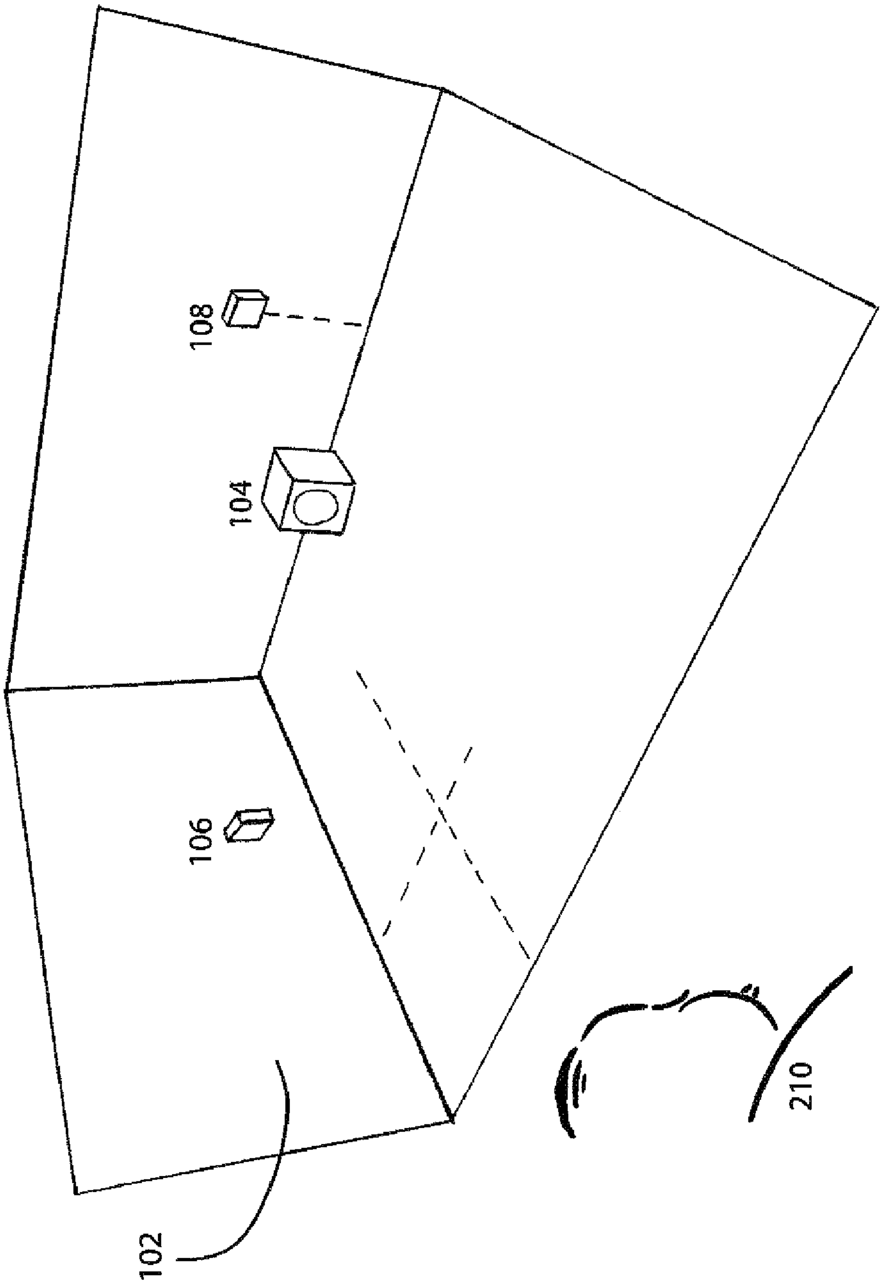
FIG. 2 illustrates a space and system elements.

FIG. 2 depicts an embodiment comprising a space 102, an excitation source 104, sensor modules 106 108, and a user 210. Each sensor module 106 108 can be responsive to acoustical energy provided by the excitation source 104. Each sensor module 106 108 can provide a light output that is responsive to acoustical energy sensed by the sensor module, at essentially the position of the sensor module. A user 210 can observe the sensor modules' light output.

In some embodiments, the space 102 can be fully enclosed, partially enclosed, and/or essentially non-enclosed. By way of non-limiting examples, a space can correspond to all or part of a concert hall, a home theater, an outdoor theater, a classroom, an auditorium, or a house of worship. A typical medium in the space 102 is air, that is, a breathable Earth atmosphere. The medium can be any known and/or convenient working fluid that allows for both: a detectable variation of acoustical energy at a sound sensor 106 108 in the space, responsive to propagation from an excitation source 104; and, a detectable variation of optical energy at an image acquisition system 110 and/or by a user 210, responsive to propagation from a sound sensor 106 light output in the space.

An excitation source 104 can selectably provide a stimulus comprising acoustical energy to the space 102. An excitation source 104 can comprise one or more elements in and/or outside of the space that selectably contribute acoustical energy to the space. In some embodiments, the excitation source 104 can comprise one or more loudspeakers.

In some embodiments an excitation source 104 can be an audio reproduction system. The audio reproduction system can comprise a system that has otherwise been provided for and/or installed in a room, such as a sound reinforcement system. In some embodiments the excitation source 104 can be capable of selectably generating acoustical energy comprising signals of variable frequency and/or amplitude and/or shaped noise over an audible range. By way of non-limiting example, an audible range can be 20-20 kHz, 70-104 dB SPL. In some embodiments signals can be prerecorded and/or generated under control of an operator. In some embodiments signals comprising frequency sweeps can be generated at a specified comfortable listening level and/or at a specified suitable duration in order to demonstrate one or more specific acoustical problems. By way of non-limiting example, a signal can have properties of 85 dB SPL, C weighted, linear sweep, 20 Hz-2 kHz, over 1 minute. By way of non-limiting example, a specific acoustical problem can be a room mode. [SPL=Sound Pressure Level re $10^{-12}$ W/$m^2$.] It can be appreciated that although acoustical energy is herein referenced, some descriptions and specifications herein are provided in sound pressure (SPL) rather than directly in energy units; well-known mappings apply relating sound pressure and acoustical (sound) energy.

Figure 3:
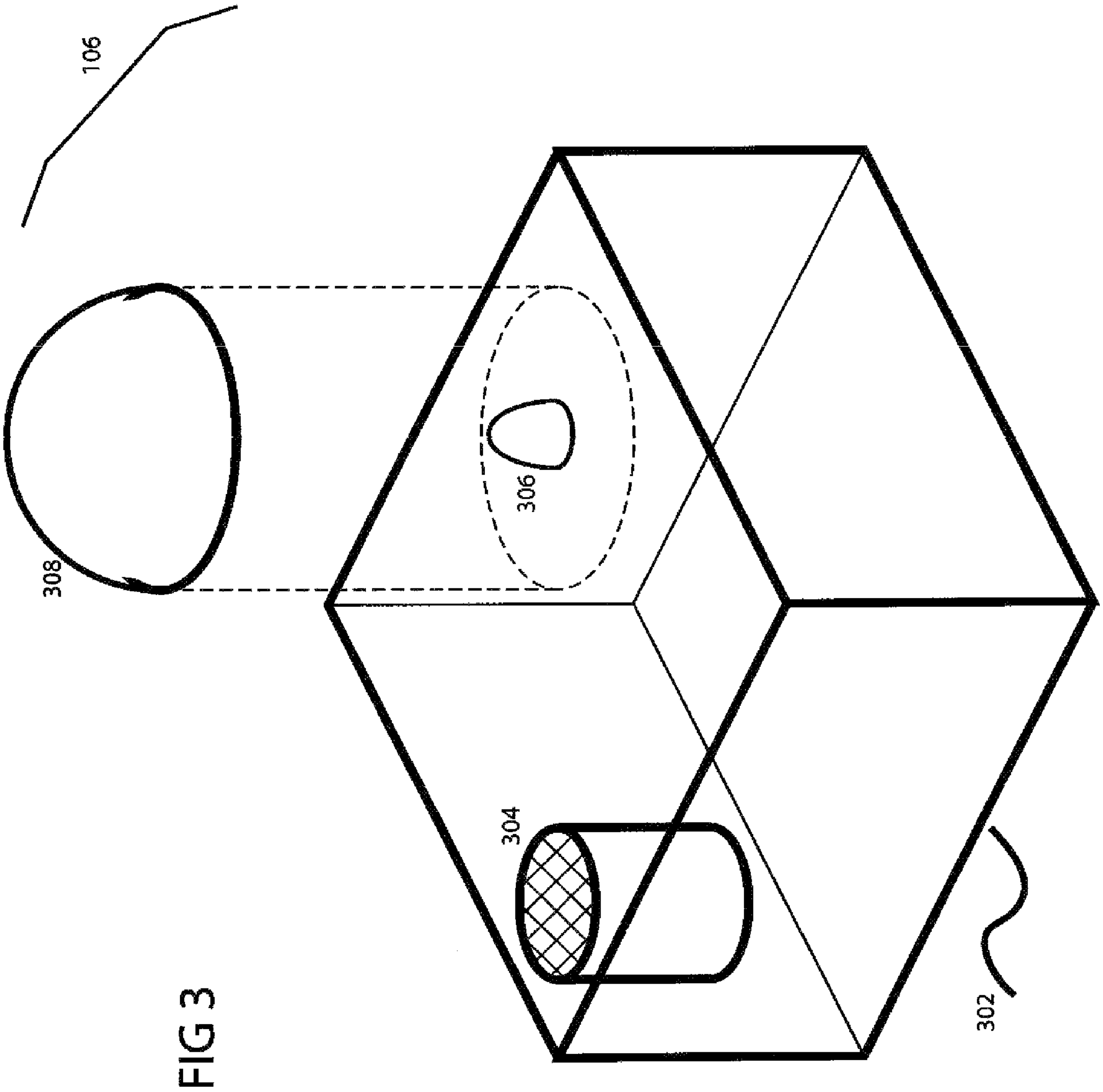
FIG. 3 illustrates an embodiment of a sound sensor module.

An embodiment of a sound sensor 106 assembly is depicted in FIG. 3. The assembly comprises a microphone 304 and a lamp 306 in combination with a housing 302. In some embodiments, a lens 308 can be fitted to the assembly in order to provide a specified directionality to the optical energy output of the lamp 306.

A sound sensor 106 can function to implement a transfer function between acoustical energy input and optical energy output. It can be appreciated that sound sensor 108 is substantially similar to sound sensor 106 in form and function, and, that additional substantially similar sensors can be deployed in some system embodiments.

The microphone 304 can receive a sound input 602 (FIG. 6) to the sensor module 106. The microphone 304 can generally comprise a sound sensor, and can generally be responsive to any measurable variation in acoustic energy transfer. The microphone can comprise a pressure-operated microphone and/or a pressure-gradient microphone and/or any other known and/or convenient transducer of acoustical energy. The microphone 304 can have a specified directionality. By way of non-limiting examples, such specified directionality can be omnidirectional, unidirectional, bi-directional, cardioid, and/or combinations of such exemplary directionalities. In some embodiments, the specified directionality can be essentially an omnidirectional response throughout only a designated hemisphere.

It can be appreciated that the directionality of the microphone 304 can be influenced by elements comprising the microphone and/or elements of the housing 302 and/or other elements of the assembly and/or the location and/or orientation of microphone elements within the housing 302. In some embodiments, specified directionality can be achieved by baffle and/or barrier features integrated within and/or in combination with the housing 302.

The lamp 306 can comprise one or more light-emitting devices. In some embodiments the lamp 306 can comprise one or more light-emitting diodes (LEDs). In some embodiments the lamp 306 can comprise a plurality of light-emitting devices, each device providing light output of essentially the same specified color. In some embodiments the lamp 306 can comprise a plurality of light-emitting devices, wherein one or more of the devices provide a light output of a specified different color. The use of the word "color" herein encompasses optical wavelengths that are ordinarily visible and ordinarily not visible to humans, including infrared and ultraviolet. Similarly, references to light and/or light-emitting generally include all optical wavelengths, without limitation to a visible spectrum.

In some embodiments the optical energy output of a sound sensor 106 can vary directly in level with a received acoustical energy input, within usable ranges. That is, increases and decreases in acoustical energy levels can result in corresponding increases and decreases in optical energy output. In some embodiments, the optical energy output of a sensor module 106 can vary by color in response to the acoustical energy input, within usable ranges. That is, increases and decreases in acoustical energy levels can result in detectable changes in color of the optical energy output, comprising a variation in wavelengths and/or variation in combinations of wavelengths represented in the light output. In some embodiments, the optical output of a sensor module 106 can vary by color and/or in power level responsive to and corresponding to changes in acoustical energy levels. In short, brightness and color can be combined.

Light output from the lamp 306 can be adapted for a specified directionality by means of a selectably fitted lens 308 such as depicted in FIG. 3. The lens 308 can comprise a diffusor and/or any other known and/or convenient light-scattering and/or light-focusing element. In some embodiments the lens 308 can comprise an omnidirectional diffusor with essentially uniform hemispherical distribution throughout only a designated hemisphere. It can be appreciated that an essentially omnidirectional distribution of optical energy output from sensor modules 106 108 can allow for greater flexibility in positioning an image acquisition system 110 for use in combination with the sensor modules.

In some embodiments of a sensor module 106, the lamp 306 can be located in close proximity to the microphone 304, in order for the sensor module 106 light output to correspond accurately to the acoustical energy at the position of the lamp.

In some embodiments, a sensor module 106 can comprise electronics with suitable characteristics to transform a signal from the microphone 304 to signals suitable for operating a lamp 306. Such characteristics can include signal processing and/or amplification and/or any other known and/or convenient means of transformation. In some embodiments it can be desirable to specify the span of acoustical energy input level that results in maximum variation in lamp output to be no less than approximately 20 dB.

In some embodiments, a sensor module 106 can be powered by elements incorporated into the module. That is, a sensor module can be self-powered by a battery and/or any other known and/or convenient method of integrated power supply. It can be appreciated that some embodiments of a sensor module 106 can be advantageously operated without recourse to wired connections between the sensor module 106 and other objects.

Figure 4:
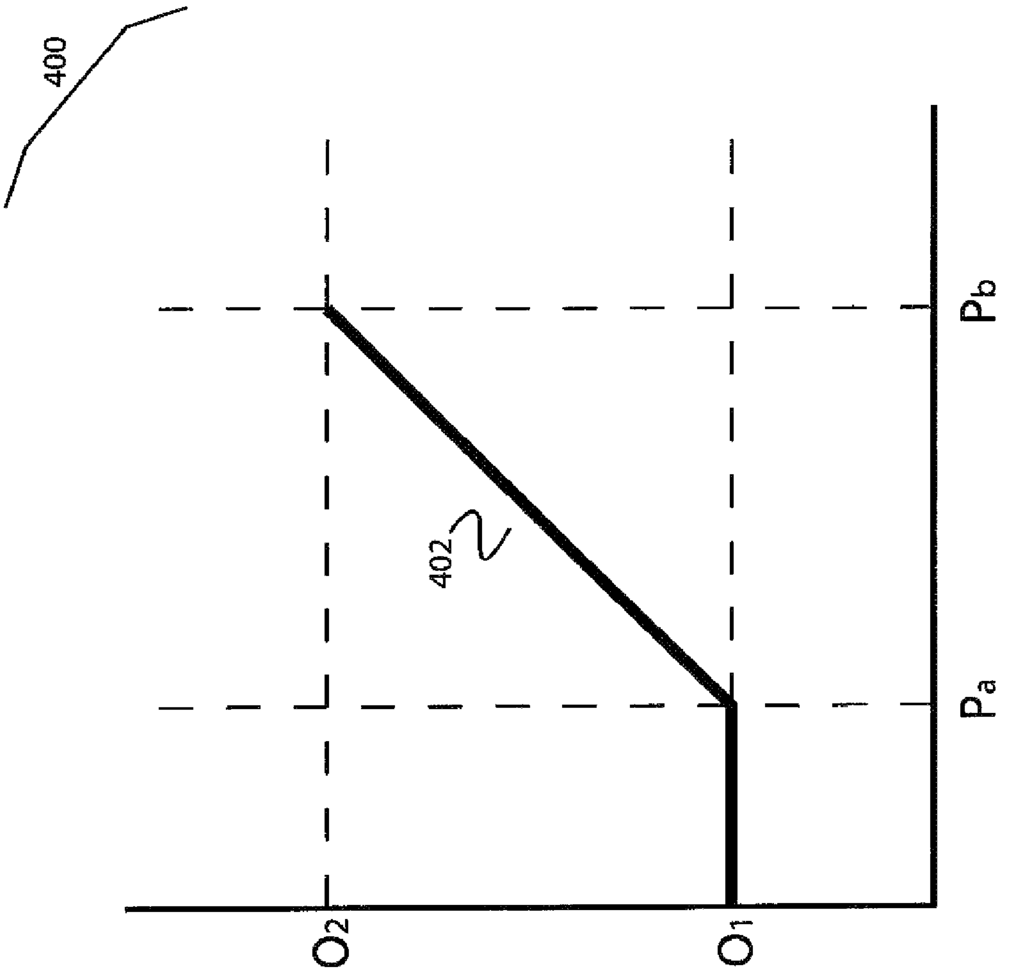
FIG. 4 illustrates an acoustical input to optical output transfer function
Figure 5:
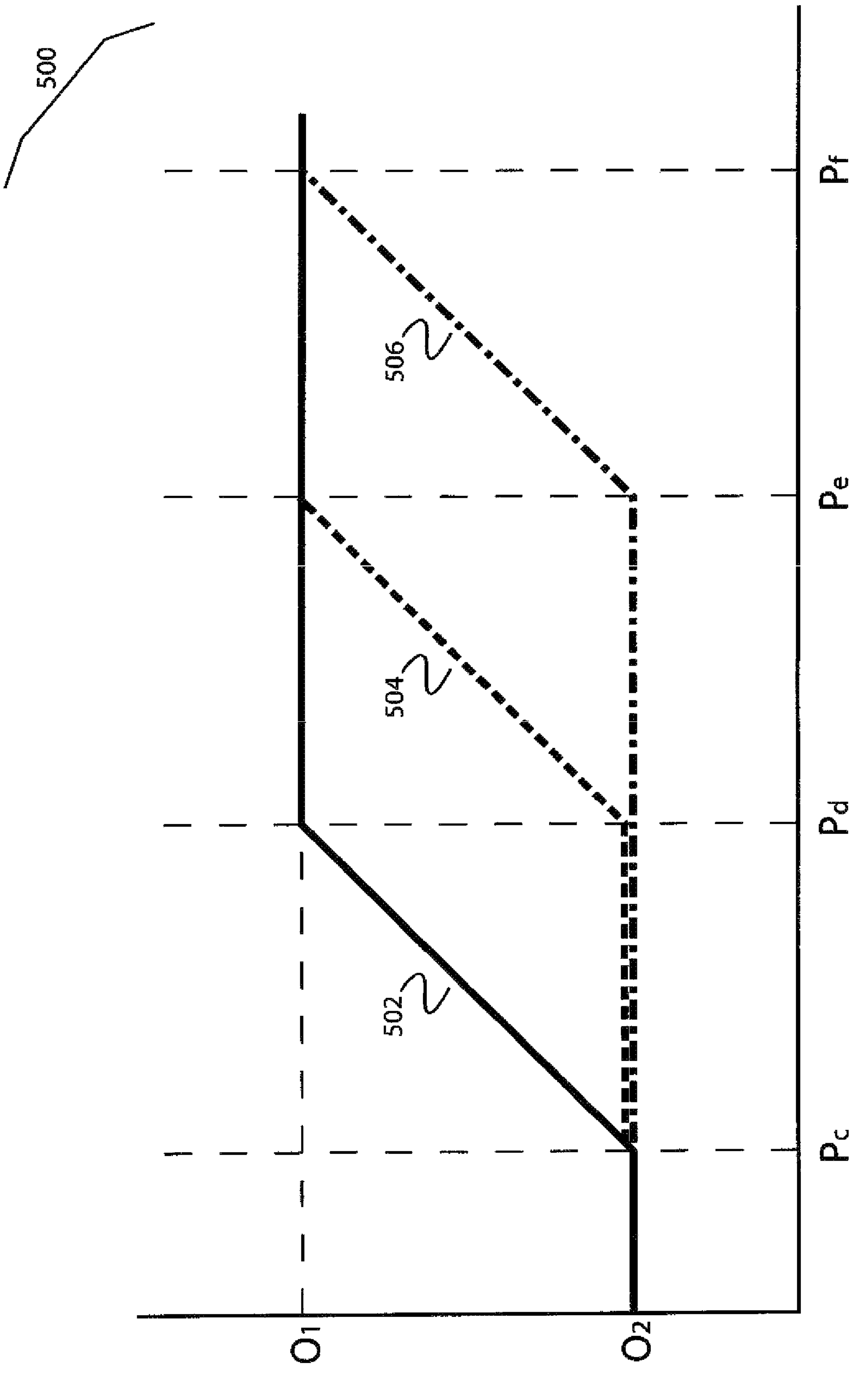
FIG. 5 illustrates an acoustical input to optical output transfer function

FIGS. 4 and 5 depict graphs 400 500 of exemplary transfer functions for sound sensor embodiments. For each graph, the abscissa corresponds to acoustical energy input and the ordinate corresponds to optical power output.

In the first graph 400 the transfer function shown 402 indicates that optical power output is at a minimum value of $O_1$ for acoustical energy input of less than Pa. As acoustical energy increases from Pa to Pb, optical power output increases correspondingly from $O_1$ to $O_2$.

In one exemplary embodiment, the parameters of graph 400 have the following approximate values (acoustical energy is in dB SPL C-weighted, slow, and optical power is in mW): Pa=80, Pb=100, $O_1$=0, $O_2$=450. The transfer function 402 is depicted as linearly and monotonically increasing in the span between (Pa, $O_1$) and (Pb, $O_2$). It can be appreciated that in some embodiments, other monotonically increasing functions applied to this interval can be useful. This transfer function 402 is an example of a transfer function wherein the optical energy output of a sound sensor can vary directly in level with the acoustical energy input. Simply put, a brighter lamp can indicate a higher level of acoustical energy.

It can be appreciated that in the numerical example just described, values for $O_1$ and $O_2$ are provided for electrical power input applied to a light-emitting device. Although these values are not necessarily direct measures of optical power output, the optical power can vary directly with the applied electrical power in a known and/or specified manner.

In the second graph 500, transfer functions 502 504 506 corresponding to three distinct light-emitting devices are combined. A first transfer function 502 describes a device with a direct variation of optical energy output (from $O_1$ to $O_2$) with acoustical energy over the acoustical energy input range of Pc to Pd. Similarly, a second transfer function 504 describes a similar device with direct variation over an input range of Pd to Pe. The third transfer function 506 describes a similar device with direct variation over an input range of Pe to Pf. In the case that the transfer functions 502 504 506 each separately correspond to a device that emits a distinct color (wavelength), these devices employed in combination in a lamp 306 can provide for optical energy output of a sound sensor to vary in color with changes in acoustical energy input over a specified range (Pc to Pf). It can be appreciated that these devices employed in combination in a lamp 306 can also provide, at the same time, a direct variation of optical energy output with acoustical energy. That is, the combined optical output power irrespective of color is depicted as monotonically increasing over the input range Pc to Pf.

In some embodiments, a transfer function corresponding to a sensor module 106 can be essentially "AC-coupled" with respect to the acoustical energy input. That is, a transfer function can be relatively unresponsive to relatively slow changes in atmospheric pressure. In some cases, such changes could be categorized as comprising "sound" energy at frequencies well below a range of interest such as a human-audible range comprising a lower limit of approximately 20 Hz.

In some embodiments, a transfer function corresponding to a sensor module 106 can be an essentially instantaneous mapping of acoustical energy input value to an optical power output value. By way of non-limiting example, the optical power output can be made to vary directly and essentially instantaneously with deflection of a pressure microphone element. In some embodiments, the sensor input and/or output can be adapted with one or more of a specified time-delay, time-based filtering, sampling, peak holding, and/or any other known and/or convenient time-based processing of the input and/or output signals.

Figure 6:
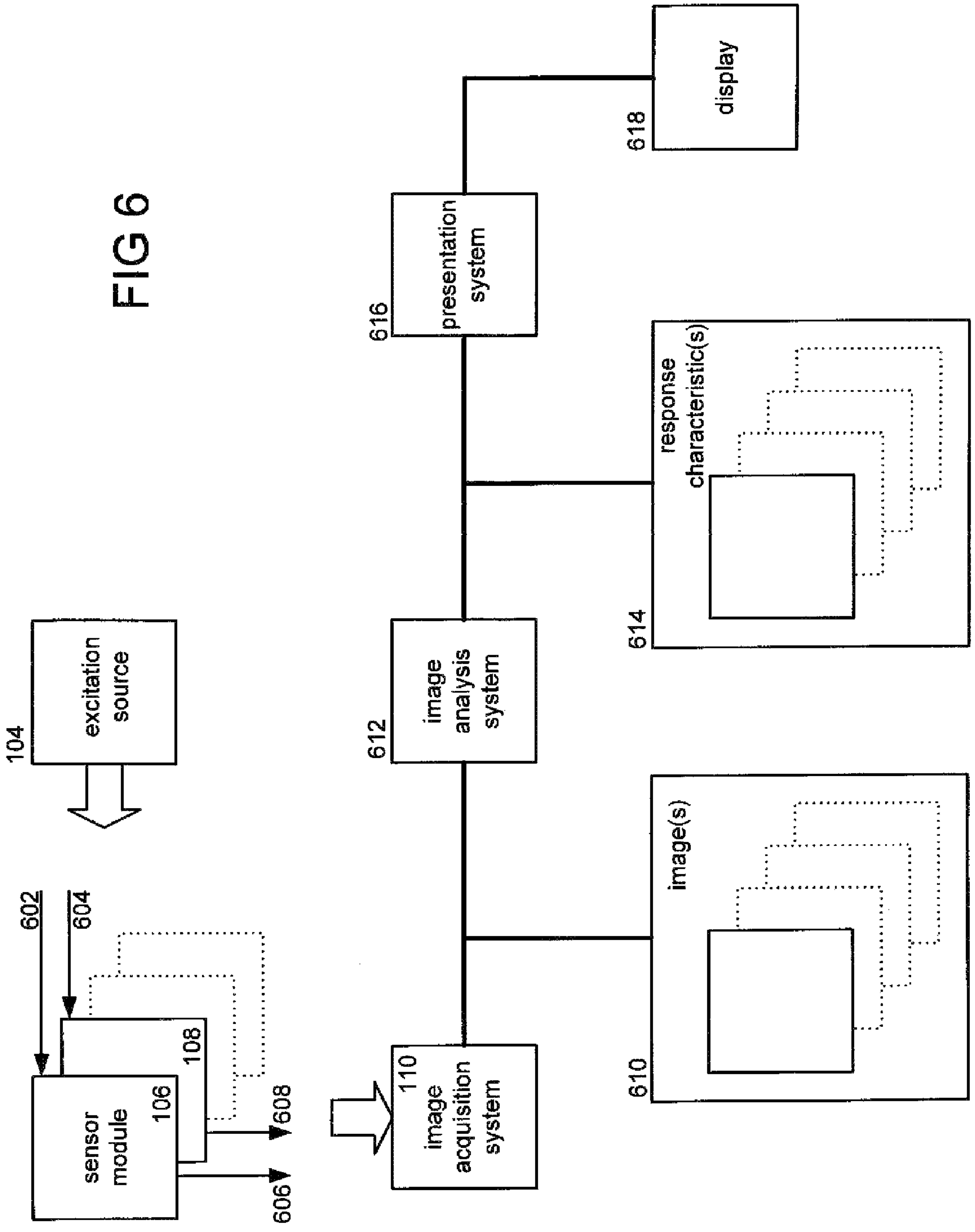
FIG. 6 illustrates a block diagram of system elements.

A system embodiment is depicted in FIG. 6. An excitation source 104 selectably provides acoustical energy to a space 102. Responsive to the excitation source 104, acoustical energy at sensor modules 106 108 is sensed by sound inputs 602 604 (respectively). Each sensor module 106 108 can implement a specified transfer function, providing optical energy outputs denoted light outputs 606 608 (respectively) responsive to sound inputs 602 604 (respectively). An image acquisition system 110 can acquire one or more images 610, each image responsive to light outputs 606 608 and the positions of the sound sensors. An acquired image 610 can comprise position information corresponding to the light outputs 606 608.

An image acquisition system 110 can comprise one or more cameras. In some embodiments a camera can be a digital video camera adapted with a lens suitable for imaging a deployed plurality of sound sensors. In some embodiments camera frame rate and resolution can be adjusted to specified requirements. In some embodiments, a "web cam" operated in a mode comprising 320×240 pixels, 8 bit greyscale, and 30 frames/sec can be used. In some embodiments, still images can be acquired and stored and/or transmitted to a remote site for analysis. In some embodiments, 24-bit RGB color format images can be acquired in order to enable processing for configurations wherein sensor modules light outputs are adapted to vary light color output responsive to acoustical energy input. In alternative embodiments, a camera can be any known and/or convenient image capturing system.

The parameter "L" as used herein can correspond to a value of intensity or luminance or color or any other known and/or convenient registration of optical power received in an image.

An image sampled in two dimensions can be represented by a data set comprising data points (Xk, Ym, $L_{km}$) wherein $L_{km}$ represents a value registered in the image at location Xk along an X axis and Ym along a Y axis. The X and Y axes can be orthogonal. In some embodiments, k and m can simply be sampling indices along their respective axes.

A position Pc(n) of an $n^{th}$ sound sensor in an acquired image can be specified and/or can be determined by using processing techniques utilizing one or more suitable acquired images. In some embodiments, a suitable acquired image can be obtained within a calibration process.

An image analysis system 612 can determine one or more sound pressure response characteristics 614 from one or more acquired images 610. A response characteristic can comprise one or more data points, each data point comprising a position and an associated response value, and each data point corresponding to a specified sound sensor.

Position can be expressed corresponding to location in an image and/or expressed corresponding to location in a space of interest. Pc(n) can represent position of an $n^{th}$ sound sensor in an image, and Ps(n) can represent position of an $n^{th}$ sound sensor in a space of interest. There can be a specified mapping between Pc(n) and Ps(n) for a given sound sensor in a system embodiment.

Positions within the space of interest can be represented in two dimensions, three dimensions, and/or any other known and/or convenient spatial representation. In two dimensions, Ps(n) can correspond to (Xn, Yn). That is, the location of the $n^{th}$ sound sensor can correspond to position Xn on an X axis, and position Yn on a Y axis.

In three dimensions, Ps(n) can correspond to (Xn, Yn, Zn), where the location of the $n^{th}$ sound sensor can additionally correspond to position Zn on a Z axis. In some embodiments axes can be orthogonal.

A response value can be expressed in terms of an image value "L" and/or expressed in terms of an acoustical energy value "S". L(n) can represent an image response value corresponding to an $n^{th}$ sound sensor in an image, and S(n) can represent an acoustical energy value. By way of non-limiting examples, L(n) can be expressed on a luminance scale, and S(n) can be expressed in SPL. There can be a specified mapping between values of L(n) and values of S(n).

An L(n) value corresponding to an $n^{th}$ sound sensor in an acquired image can be determined by processing image data corresponding to that image. The image data can comprise a set of data points (Xk, Ym, $L_{km}$) having values corresponding to image pixels. Pixels having a selected proximity to a specified sensor location Pc(n) in the image can be identified and/or grouped together. $L_{km}$ values corresponding to the proximate pixels can be processed by one or more of thresholding, averaging, peak-detecting, and/or any other known and/or convenient processing function in order to determine an L(n) value. In some embodiments it can be useful to combine the data and/or analysis of two or more acquired images that are responsive to the same specified stimulus provided by the excitation source, in order to determine an L(n) value. By way of non-limiting example, pixel values from a continuous sequence of acquired video frame images responsive to a 1 kHz test tone at a specified level could be averaged, thus providing an averaged acquired image data set that can have useful properties. In some embodiments, processing can be implemented by software.

L(n) values for n=1,Q, for $Q \geqq 2$, corresponding to a quantity Q sound sensors in an acquired image can be determined by processing image data corresponding to the acquired image, by repeated operations as just described.

In some embodiments, $L_{km}$ and/or L(n) values may further be adjusted with specified gamma correction and/or other techniques in order to support specific system performance features.

A sound pressure response characteristic can comprise one or more data points. Each data point can be expressed as a combination of one or more of Pc(n) and Ps(n), and one or more of L(n) and S(n), corresponding to an $n^{th}$ sound sensor. Generally, a sound response characteristic can be expressed as one or more data points (Pc(n), Ps(n), L(n), S(n)).

A response characteristic 614 can correspond to a distinct specified stimulus provided by the excitation source, such as a specified frequency tone. One or more images acquired and responsive to the specified stimulus can be analyzed to determine data points comprising the response characteristic. A set of data points such as (Ps(n),S(n)) for n=1, Q, for $Q \geqq 2$, corresponding to Q sound sensors in an acquired image can essentially comprise a spatial response characteristic for the specified stimulus. That is, for a specified stimulus, this response characteristic can span the space of interest. In some embodiments, such a spatial response characteristic can be useful in identifying room modes.

A response characteristic 614 can alternatively correspond to a specified sound sensor, and correspond to a varying stimulus provided by the excitation source, throughout a range of variation. By way of non-limiting example, the varying stimulus can comprise a specified sine wave frequency sweep.

Images can be acquired that are responsive to specific values of the varying stimulus, and analyzed to determine data points comprising the response characteristic. A set of data points for an $n^{th}$ sound sensor and spanning a variation in stimulus can essentially comprise an excitation response characteristic corresponding to the position of the sensor. That is, in the example of a frequency sweep stimulus, such a response characteristic can essentially comprise a frequency response spanning the specified frequency sweep, at the position of an $n^{th}$ sound sensor.

A response characteristic can comprise one or more of a spatial response characteristic and/or one or more of an excitation response characteristic.

A presentation system 616 can provide a display 618 responsive to one or more response characteristics 614.

A display 618 can comprise a representation of one or more response characteristics that is suitable for human perception. By way of non-limiting examples, a display 618 can comprise a visual display such as an illustration, graph, and/or chart. Such a display can be presented on paper and/or by a projection system and/or on an information display device such as a video or computer monitor. By way of further non-limiting examples, a display 618 can comprise sound and/or haptic communications that convey a specified representation of a response characteristic 614 to an observer of the display.

A number of systems and methods for presenting multidimensional data for human understanding are well-known in the art. The presentation system 616 can comprise such systems and/or methods and/or any other known and/or convenient systems and/or methods of presenting multidimensional data for human understanding. By way of non-limiting example, a personal computer in combination with a commercial or non-commercial software application can have the capability to generate graphics responsive to a data set (such as a one or more response characteristics), wherein the data set comprises data points, and wherein the data points comprise position and value entries.

A display 618 can comprise a contour plot responsive to one or more response characteristics. The contour plot can present data corresponding to positions in an acquired image Pc(n) and/or corresponding to positions in a space of interest Ps(n).

A display 618 can comprise a surface plot responsive to one or more response characteristics. The surface plot can present data corresponding to positions in an acquired image Pc(n) and/or corresponding to positions in a space of interest Ps(n).

In some embodiments the presentation system 616 can provide a display 618 of an acquired image 610.

In some embodiments the presentation system 616 can provide a sequence of displays 618, each sequenced display corresponding to a specified response characteristic 614 and/or acquired image 610. In some embodiments the sequence of displays 618 can be graphical and presented as frames of a moving picture, essentially comprising an animation.

A plurality of sensor modules 106 108 can be deployed within a space 102 that is a listening environment. In some embodiments more than two sensor modules can be deployed. In some embodiments one or more sensor modules can be deployed advantageously to positions specified as locations of intended listeners' heads and/or ears. In some embodiments sensor modules can be deployed advantageously to positions at room boundaries and/or on and/or near reflective surfaces such as furniture. Sensor modules can generally be deployed at the discretion of an operator of the system.

Sensor modules can be deployed in arrays of 1 and/or 2 and/or 3 dimensions. Each dimension can be spanned by a specified quantity and/or spacing of sensor modules. Spacing of the sensor modules in each dimension can be non-uniform. A quantity of sensor modules disposed over a specified distance in a specified dimension can be unequal to a quantity of sensor modules disposed over a specified distance in a different specified dimension. The quantity and/or spacing of sensor modules can be made uniform in one or more dimensions and/or between dimensions in order to facilitate spatial sampling of response in a specified space; that is, a room response. The Nyquist criterion and/or other criteria can be employed to determine advantageous spacing corresponding to a frequency of interest in one or more specified dimensions.

In some embodiments a two-dimensional representation of sound sensors positions Ps(n) can correspond to a plurality of sound sensors disposed in essentially a single plane in a space. The plane can correspond to a plane of interest in a space. In some embodiments, a plane of interest can correspond essentially to a set of typical positions of some listeners' ears and/or heads in a theater or auditorium. In some embodiments, a plurality of sound sensors can be arranged in an essentially planar array and attached to a structure that maintains that arrangement; this can correspond to a plane of interest.

In some embodiments, one or more processes for calibrating elements of the system can be employed.

Position values Pc(n) in an image for one or more of the deployed sensor modules can be provided and/or determined, as these position values can be needed in order to accomplish certain image analysis operations, such as some operations provided by the image analysis system 612. In some embodiments, the excitation source 104 can selectably provide a stimulus to the space to which all of the deployed sensor modules respond with a known specified maximum optical power output (such as $O_2$ in FIG. 4 and FIG. 5). In some embodiments each sound sensor can support a selectable mode wherein the optical energy output is provided at a specified level, a calibration level. Such a calibration level can be essentially uniform across all the deployed sensors. In these embodiments, the image acquisition system 110 can acquire an image of all of the participating sensors while each sound sensor is providing a specified optical energy output level. Processing of the acquired image can determine Pc(n) for a sound sensor included in the image. Processing steps appropriate to determining location of discrete illuminated objects in an image are well-known in the art and can comprise peak-detection, filtering, and/or any other known and/or convenient processing step.

An image of all of the participating sensors acquired as above, while each of the participating sound sensors are providing a substantially uniform specified optical energy output level corresponding to a specified acoustical energy level, can also be employed in order to determine a mapping of L(n) to S(n) for each sound sensor. That is, an image response value L(n) for each sensor responsive to the specified optical energy output level can be determined from the image acquired as just described. For each sound sensor, this L(n) can be used to determine a mapping from any received image response value L(n) at the $n^{th}$ sound sensor position Pc(n) to an acoustical energy value S(n) for that sensor. In some embodiments, this can be understood as determining one point on a line of known slope, essentially pinning a line to a graph. In some embodiments a mapping curve or function can have further complexity and/or inflection exceeding that of a linear function. A mapping from each L(n) to S(n) can be determined separately for each of the deployed sound sensors.

In some embodiments a sound sensor image position Pc(n) can be determined using images acquired without recourse to a calibration process. A mapping between Pc(n) and the position in space Ps(n) of the $n^{th}$ sound sensor can be provided and/or determined.

In some embodiments, operation of the system can comprise the excitation source 104 providing acoustical energy to the space 102 as a specified tone and/or a specified shaped noise, and/or a frequency sweep comprising tone and/or comprising shaped noise and/or an impulse. The sensor modules 106 108 can provide light outputs 606 608 responsive to acoustical energy sensed at the sound inputs 602 604. The acoustical energy at the sound inputs 602 604 can be responsive to the stimulus of the excitation source 104 and can be responsive to characteristics of the space 102. In some embodiments a user 210 (e.g., a person) can view the space 102 and sound sensors 106 108 directly during operation, thereby obtaining an advantageous understanding of a room response. The user 210 can employ such understanding to adjust acoustical and/or other properties of the space and/or system. By way of non-limiting example, a user 210 could observe a significant difference in light output between sound sensors 106 108 for a specified stimulus, such as a sine wave tone at 1 kHz applied by the excitation source 104. Based on such an observation, a user can adjust the position of a first sound sensor 106 such that the light output of sound sensor 106 more closely matches the light output of sound sensor 108, thereby accomplishing an increased matching of response at the sensors' respective positions for the specified stimulus.

In some embodiments, each sound sensor 106 108 can be adapted to have a specified delay between a variation in received sound inputs 602 604 and responsive variations in respective light outputs 606 608. A specified delay can comprise a specified latency and/or a specified variability. By way of non-limiting example, one specified delay can be expressed as 5 microseconds plus or minus 1 microsecond.

In some embodiments, an excitation source 104 can provide an impulse signal as a stimulus. Arrival time of an initial wave front and/or subsequent reflections at sound sensors 602 604 positions can be indicated by light outputs 606 608. In some embodiments, sequential images 610 can be acquired by the image acquisition system 610 at a specified input rate. Such image acquisition can comprise high-speed photography. In some embodiments a presentation system 616 can provide a display 618 corresponding to sequential images 610 and/or response characteristics 614 at a specified output rate. In some embodiments, an output rate and/or input rate can be specified so as to advantageously provide for the display 618 to illustrate initial wave front propagation and/or subsequent reflections in a static and/or animated manner.

In some embodiments, observable features of the system can inform an operator and/or user, who can responsively and/or advantageously make adjustments to the space and/or to elements of the system.

It can be appreciated that the system can operate most effectively in the absence of extraneous acoustical noise and/or light. Operating the excitation source at relatively high sound levels can be advantageous in overcoming signal-to-noise ratio problems that can result from uncontrolled sounds and/or background noise present in a space of interest. Similarly, it can be advantageous to minimize levels of ambient and intrusive light, particularly for wavelengths used and/or sensed by the system.

In some embodiments, instructions 702 for using the system can be provided. In some embodiments, instructions 702 can comprise one or more sheets of paper. In some embodiments, instructions 702 can comprise printed matter and/or magnetically recorded media and/or optically recorded media and/or any known and/or convenient realization of communicating instructions. Instructions 702 can comprise information content describing systems and/or methods and/or processes and/or operations described herein and/or as illustrated by FIGS. 1-7.

Figure 7:
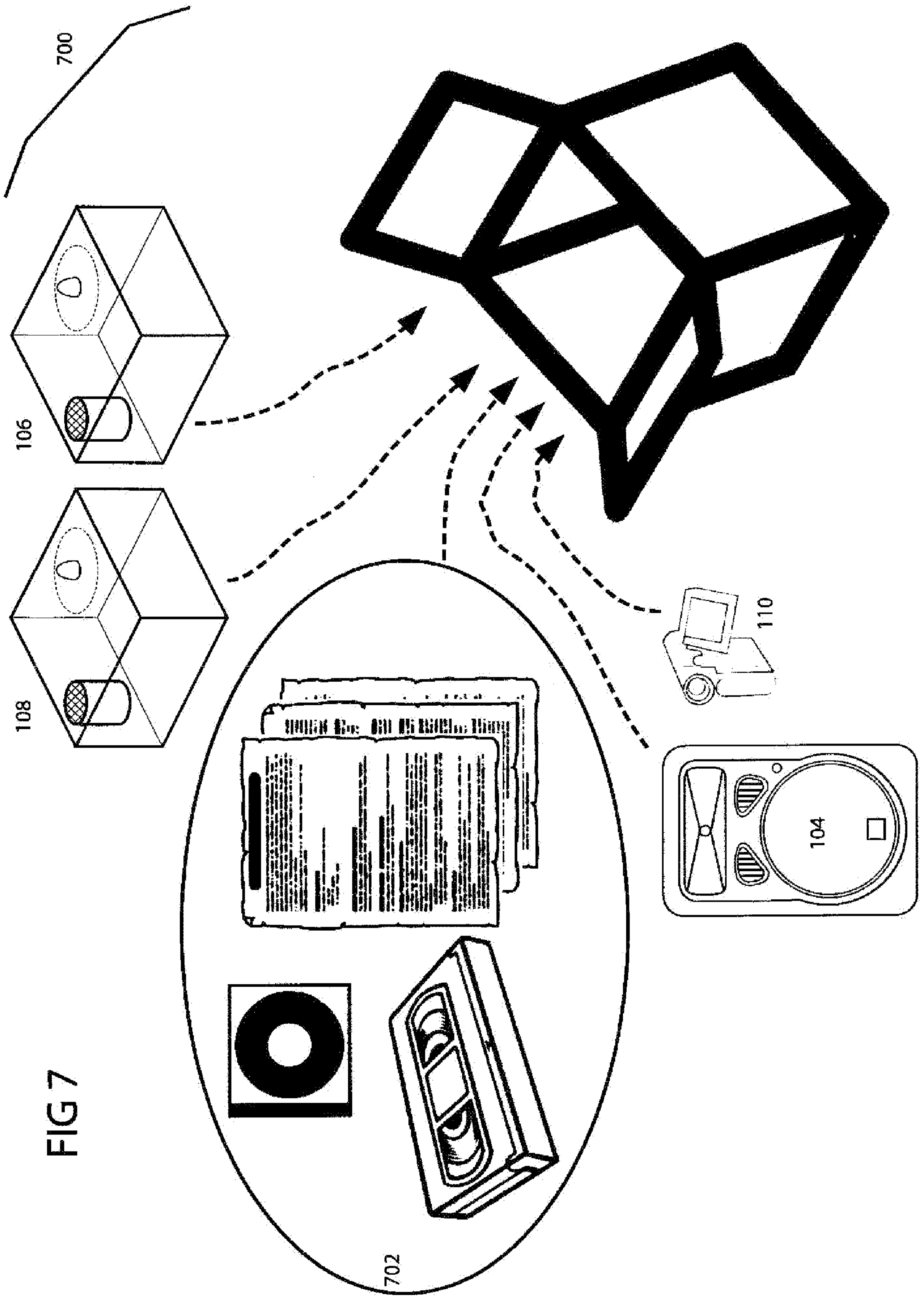
FIG. 7 illustrates a kit embodiment.

FIG. 7 illustrates a kit embodiment 700. In some embodiments, a kit 700 can comprise instructions 702 and/or a first sounds sensor 106 and/or a second sound sensor 108. In some embodiments, a kit 700 can further comprise an excitation source 104 and/or an image acquisition system 110.

In the foregoing specification, the embodiments have been described with reference to specific elements thereof. It will, however, be evident that various modifications and changes may be made thereto without departing from the broader spirit and scope of the embodiments. The specification and drawings are, accordingly, to be regarded in an illustrative rather than restrictive sense.

The invention claimed is:

1. A system comprising:
an excitation source;
a first sensor module adapted to provide a first light output responsive to the excitation source,
wherein the first sensor module is disposed at a first position within a space,
wherein the first sensor module emits the first light output at essentially the first position;
a second sensor module adapted to provide a second light output responsive to the excitation source,
wherein the second sensor module is disposed at a second position within the space,
wherein the second sensor module emits the second light output at essentially the second position; and,
one or more light emitting devices adapted to provide color variation to the first light output, wherein the color variation is responsive to the excitation source.

2. The system of claim 1 wherein:
the first sensor module comprises a microphone adapted to provide selective directionality to a first sound input.

3. A system comprising:
an excitation source;
a first sensor module adapted to provide a first light output responsive to the excitation source,
wherein the first sensor module is disposed at a first position within a space,
wherein the first sensor module emits the first light output at essentially the first position;
a second sensor module adapted to provide a second light output responsive to the excitation source,
wherein the second sensor module is disposed at a second position within the space,
wherein the second sensor module emits the second light output at essentially the second position; and,
an image acquisition system adapted to acquire one or more images of the first sensor module and the second sensor module.

4. The system of claim 3 further comprising:
a presentation system adapted to provide a display,
wherein the display is responsive to the one or more images.

5. The system of claim 3 further comprising:
an image analysis system adapted to analyze the one or more images and to determine one or more response characteristics,
wherein each response characteristic is responsive to the one or more images, and
wherein each response characteristic corresponds to one or more positions within the space.

6. The system of claim 5 further comprising:
a presentation system adapted to provide a display,
wherein the display is responsive to the one or more response characteristics.

7. A method comprising the steps of:
providing a stimulus,
wherein the stimulus comprises acoustical energy;
sensing acoustical energy at a first position and responsive to the stimulus;
emitting a first light output responsive to the stimulus,
wherein the first light output is emitted at essentially the first position;
sensing acoustical energy at a second position and responsive to the stimulus;
emitting a second light output responsive to the stimulus,
wherein the second light output is emitted at essentially the second position; and,
providing color variation to the first light output, responsive to the stimulus.

8. The method of claim 7 further comprising the step of:
sensing acoustical energy with selective directionality at the first position.

9. A method comprising the steps of:
providing a stimulus,
wherein the stimulus comprises acoustical energy;
sensing acoustical energy at a first position and responsive to the stimulus;
emitting a first light output responsive to the stimulus,
wherein the first light output is emitted at essentially the first position;
sensing acoustical energy at a second position and responsive to the stimulus;
emitting a second light output responsive to the stimulus,
wherein the second light output is emitted at essentially the second position ; and,
acquiring one or more images of the first light output and the second light output.

10. The method of claim 9 further comprising the step of:
providing a display,
wherein the display is responsive to the one or more images.

11. The method of claim 10 further comprising the steps of:
analyzing the one or more images; and,
determining one or more response characteristics,
wherein each response characteristic is responsive to the one or more images, and
wherein each response characteristic corresponds to one or more positions within a space.

12. The method of claim 11 further comprising the step of: providing a display, wherein the display is responsive to the one or more response characteristics.

13. A kit comprising:

a first sensor module;

a second sensor module;

an image acquisition system; and, instructions directing a user to:

dispose the first sensor module at a first position within space, dispose the second sensor module at a second position within the space, operate an excitation source, observe a first light output of the first sensor module, observe a second light output of the second sensor module, and operate the image acquisition system to acquire one or more images of the first sensor module and the second sensor module.

14. The kit of claim 13 further comprising:

a presentation system; and, further instructions directing the user to:

operate the presentation system to provide a display.

15. The kit of claim 13 further comprising:

an image analysis system; and, further instructions directing the user to:

operate the image analysis system to analyze the one or more images and to determine one or more response characteristics.

16. The kit of claim 15 further comprising:

a presentation system; and, further instructions directing the user to:

operate the presentation system to provide a display.

* * * * *